3,038,156
RADIO BEAM COUPLER
Stephen S. Osder, Phoenix, Ariz., assignor to Sperry Rand Corporation, Great Neck, N.Y., a corporation of Delaware
Filed Sept. 23, 1959, Ser. No. 841,820
10 Claims. (Cl. 343—107)

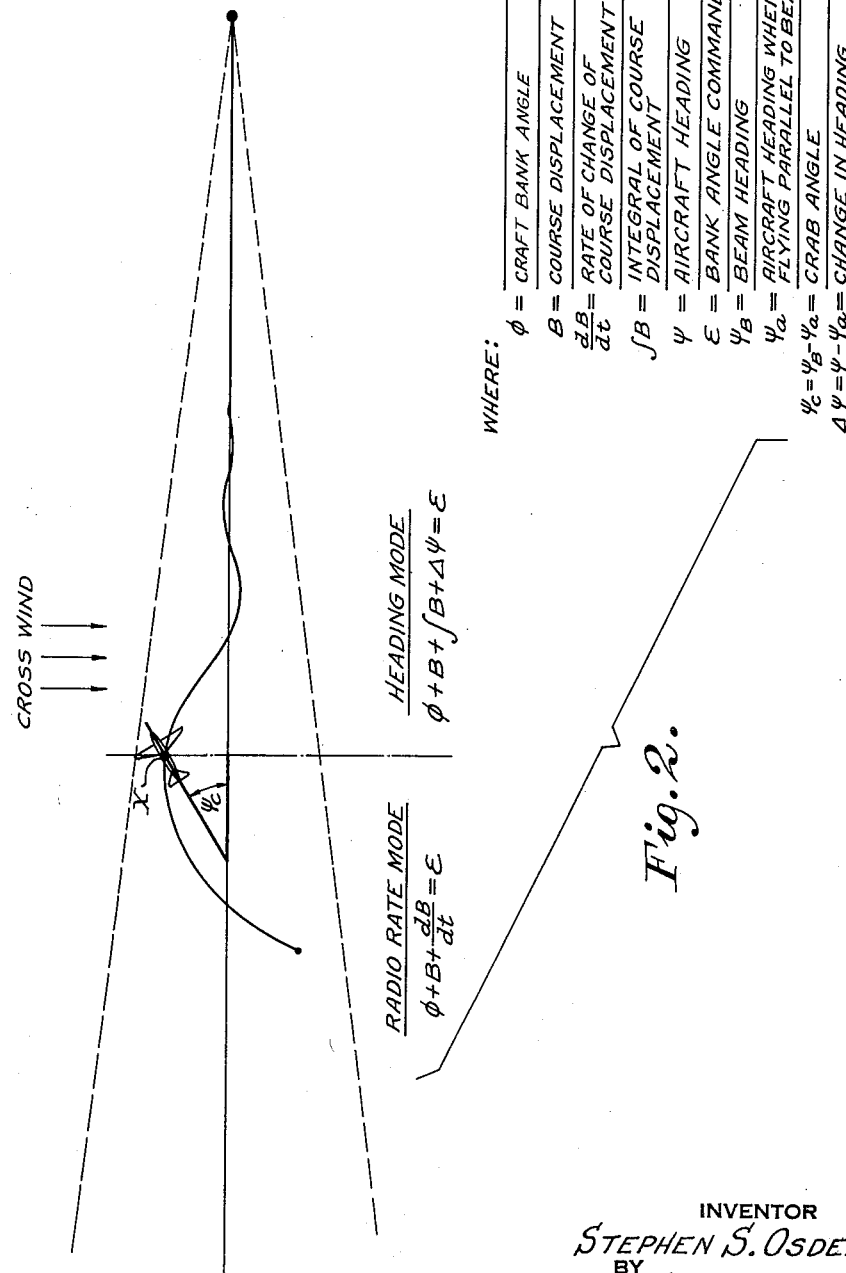

This invention relates to apparatus for automatically controlling the flight of an airplane along a radio beam and more particularly is concerned with means for automatically sensing, bracketing and coupling onto the beam.

Generally, in the beam bracketing maneuver, the autopilot of an aircraft laterally displaced from the beam generates a bank angle command signal $\phi$ and equates the generated bank angle signal to a course or beam displacement signal B. That is, when a large course displacement signal exists, a large bank angle signal must be generated to bring the aircraft onto the course. Correspondingly, when a small course displacement signal exists, only a small bank angle signal is necessary to equate the displacement signal. However, the equation of course displacement and bank angle is the equation of an undamped oscillatory condition. Therefore, a damping term is usually added to the aforementioned equation to prevent oscillation about the axis of the beam. The damping term employed may take many different forms. However, the most usually employed damping terms are the rate of change of course displacement signal $$\frac{dB}{dt}$$

i.e. cross course rate, and the heading signal $\psi$. That is, an equation of course displacement, bank angle, and either cross course rate or heading or combinations of cross course rate and heading will be non-oscillatory about a selected radio beam.

Usually the selection of either the cross course rate term or the heading term or a term combining heading with cross course rate is dependent upon the particular aircraft environment at the time. Each of the aforesaid damping terms has qualities lacking in the other. For instance, it is well known that the cross course rate term $$\frac{dB}{dt}$$

which is derived from a radio signal, provides tight control of the aircraft during the bracketing maneuver. However, the radio derived cross course rate term has noise therein which is very objectionable at certain times. During periods when this noise is objectionable, the system usually switches to the heading damping term $\psi$ or to a term combining the respective qualities of each damping term.

In the employment of a heading damping term during periods when a cross wind exists, a beam stand-off error occurs due to the use of a false heading signal. That is, the heading signal employed includes not only a signal representing the heading the aircraft is actually moving at, but a heading error signal equal to the crab angle $\psi_c$ of the aircraft, the crab angle being a difference between the heading of the beam $\psi_B$ and the heading of the aircraft when flying parallel to the beam $\psi_a$. To negate the stand-off error signal, an integrating device is employed which integrates the steady state beam displacement and uses the result of said integration to cancel out the error signal due to crab angle. Such a technique is revealed in Patent 2,613,352, issued October 7, 1952, in the name of S. Kellogg and assigned to the assignee of the instant invention.

The employment of an integrated beam displacement signal itself has major problems associated with it. Should the integrating device begin integrating when the beam displacement is very large, a very large signal will be generated which will result in an excessive overshoot to the other side of the beam causing oscillations about the beam as the aircraft seeks the true center of the beam. These oscillations will also occur if the gain of the integrating device is increased too much to insure rapid cancellation of the crab angle signal.

In the instant invention, means is provided to switch from a radio rate mode to a heading mode when the rate of change of beam displacement is zero. During the bracketing maneuver, the rate of change of beam displacement is zero only when the aircraft is flying parallel to the beam. Flying parallel to the beam first occurs as the aircraft, having gone through the beam it is trying to bracket, turns around to get onto the beam. At the turning point, the aircraft is flying parallel to the beam and the rate of change of beam displacement is zero. It should be realized however that the aircraft, though flying parallel to the beam, probably has a heading away from the beam due to cross winds. Switching to a heading mode at the point where the craft is flying parallel to the beam in the bracketing maneuver, enables a heading reference to be established which includes therein the crab angle signal which heretofore served as a constant source of error. Since all changes in heading will now be relative to the established crab angle heading, the problem of long term stand-off due to a crab angle error signal is obviated. Also in the instant invention, the integrator, which integrates the beam displacement signal to provide cancellation of signals causing beam stand-off, is turned on at the point when the rate of change of beam displacement is zero. By turning the integrator on at this point, very large integrator output signals, which produce aircraft oscillation about the beam, cannot occur. Small integrator output signals only may occur because the aircraft, for all intents and purposes, has completed the bracketing maneuver and large deviations from the selected course will be non-existent. Thus, with the instant invention, the aircraft coupler switches to a heading mode at the proper time, eliminates the cross wind problem by selecting the crab angle heading as a heading reference, and turns on the beam displacement integrator at a point when troublesome large displacement signals cannot occur.

Accordingly, it is a principal object of the invention to provide apparatus which switches during a bracketing maneuver from a radio rate mode, i.e., the employment of rate of change of beam displacement as a damping term, to a heading mode at the proper time.

Another object is to provide a system which eliminates beam stand-off due to the presence of a cross wind by the employment of the crab angle as a heading reference in place of the true heading reference.

Another object of the invention is to set forth a system wherein integration of a beam displacement signal is begun at a time when the cross course rate is at some low value.

These and other objects of the invention will become appreciated as the invention becomes better understood in the light of the specification and the accompanying figures wherein;

FIG. 2 illustrates a typical aircraft approach onto a radio beam.

Figure 1:
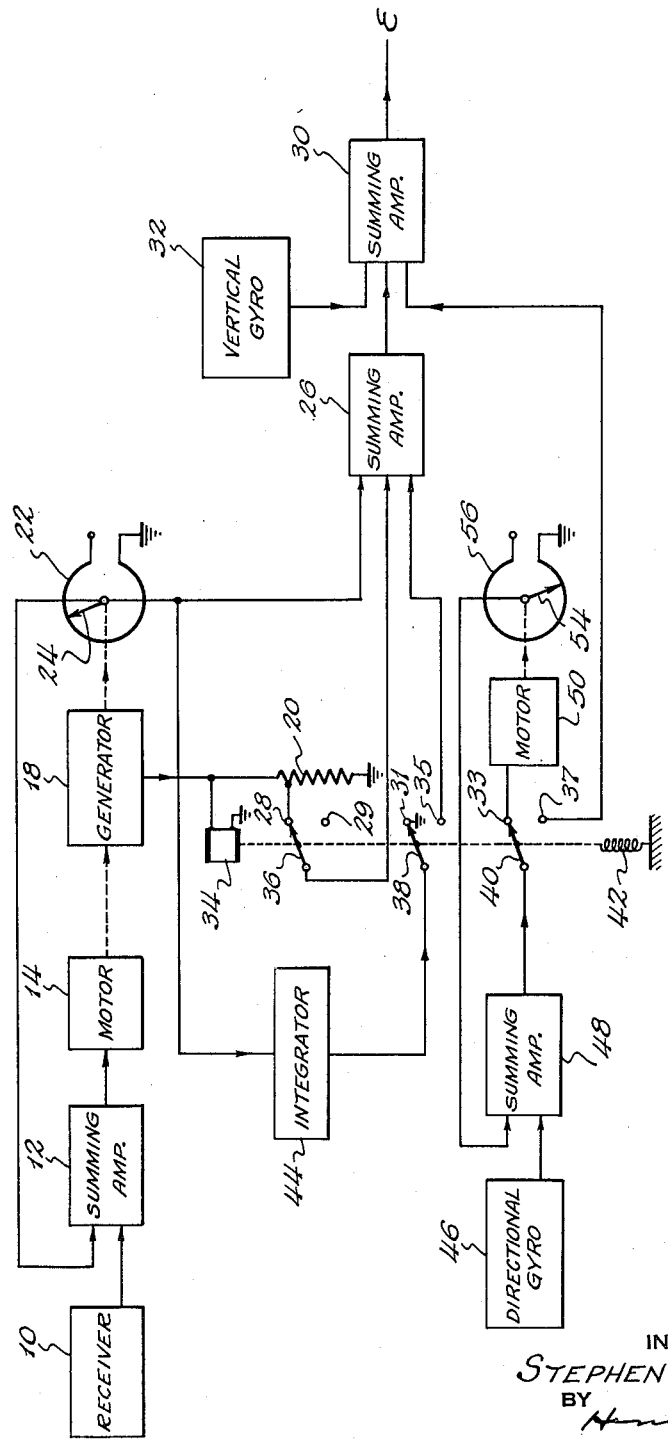
FIG. 1 depicts a schematic diagram of the preferred form of the invention.

Referring to FIG. 1, a receiver 10 produces an output signal proportional to an aircraft's displacement from the center of a radio beam and applies its output to the summing amplifier 12. The summing amplifier 12 amplifies the receiver output signal and applies said signal to the motor 14. Motor 14 is then driven an amount and in a direction determined by the receiver output signal. Motor 14 is mechanically coupled to and drives the generator 18. The generator 18 output, which is applied across resistive element 20, is a function of the rate at which the motor 14 drives the generator 18, i.e., a function of the rate of change of course displacement. Resistive element 20 is provided with taps 28 and 29. Also driven by motor 14 is the wiper 24 of potentiometer 22. Potentiometer 22 has applied across it a source of potential (not shown). The voltage on the wiper 24 is fed back to summing amplifier 12 to null out the receiver output signal which is also applied to the summing amplifier 12. Thus, the potential on the wiper 24, which is positioned in accordance with the receiver output, will be a function of the receiver output, i.e., the aircraft displacement from the beam center.

The displacement signal on wiper 24 is applied to the input of summing amplifier 26 together with the rate of change of course displacement signal available on tap 28 of resistive element 20. Summing amplifier 26, during the radio rate mode of operation algebraically adds these two input signals and applies the resultant signal to the summing amplifier 30. Summing amplifier 30 also has applied to its input circuit a signal proportional to the bank angle $\phi$ of the aircraft. This bank angle signal is derived from vertical gyro 32. Thus, during the radio rate mode, the output $\epsilon$ from summing amplifier 30 is the algebraic sum of a bank angle signal $\phi$ obtained from the vertical gyro 32, a course displacement signal obtained from potentiometer 22 and a rate of change of course displacement signal developed across resistive element 20 and available at tap 28:

$$\epsilon = \phi + B + \frac{dB}{dt}$$

(see FIG. 2).

Coupled to receive the output from generator 18 is a relay 34 which operates switches 36, 38 and 40 against the tension of spring 42 which is anchored to the aircraft frame. For generator 18 output voltages greater than zero, relay 34 is energized and holds switches 36, 38 and 40 respectively on tap 28, contact 31 and contact 33. When relay 34 is de-energized by a generator output of zero volts, the switches 36, 38 and 40 are respectively moved to tap 29 and contacts 35 and 37 by the action of spring 42.

When switch 38 is on contact 35, an integrator 44, receiving the course displacement signal available on wiper 24, is coupled to summing amplifier 26.

A directional gyro 46 provides a true heading signal $\psi$ to summing amplifier 48. Said heading signal $\psi$ is amplified by amplifier 48 which then provides a drive signal to motor 50 when switch 40 is on contact 33. Motor 50 is mechanically coupled to and drives wiper 54 of potentiometer 56. Potentiometer 56 has applied across it a source of potential (not shown). The potential on wiper 54 is fed back to summing amplifier 48 where said fed-back signal operates to null out the heading signal $\psi$ from the directional gyro 46. In this way, i.e. when switch 40 is on contact 33, wiper 54 is made to follow up on the heading signal $\psi$ input to summing amplifier 48. When switch 40 is released to contact 37 by the appearance of a zero rate of change of course displacement signal being fed to relay 34, the wiper 54 is halted in the position it was in at the time relay 34 released switch 40 to contact 37. Thus, a heading signal $\psi_a$ which is a function of the aircraft heading at the time relay 34 is de-energized, is constantly fed back to the summing amplifier 48. Then, the output of summing amplifier 48, $\Delta\psi$, after de-energizing relay 34 is the algebraic sum of signals representative of the heading $\psi_a$ when said rate of change of course displacement is zero and the true heading $\psi$ of the aircraft.

At the time when relay 34 is de-energized by the presence of a zero voltage at the output of generator 18 and switches 36, 38 and 40, respectively, move to tap 29 and contacts 35 and 37, the system switches from the radio rate mode to the heading mode of operation. Summing amplifier 26 now has no rate of change of course displacement signal applied thereto from resistor 20. Also, a signal proportional to the integral of course displacement available from the output of integrator 44 and a signal proportional to the course displacement available on wiper 24, are coupled to summing amplifier 26. These two signals are then algebraically added by summing amplifier 26 and the composite signal $(\int B+B)$ is applied to summing amplifier 30. Summing amplifier 30 also has applied thereto, from vertical gyro 32, a signal proportional to the aircraft bank angle $\phi$ and the composite heading signal $\Delta\psi$. Thus, during the heading mode, the output $\epsilon$ from summing amplifier 30 is the algebraic sum of a bank angle signal $\phi$, a first composite signal $(\int B+B)$ and a second composite signal $\Delta\psi$:

$$\epsilon = \phi + B + \int B + \Delta\psi$$

(see FIG. 2).

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for guiding an aircraft onto a selected course comprising first means producing a signal proportional to the bank angle of said aircraft, second means producing a signal proportional to the aircraft displacement from said course, third means producing a signal proportional to the rate of change of displacement from said course, fourth means producing a signal proportional to the heading angle of said aircraft relative to said selected course, fifth means coupled to said third and fourth means and responsive to said third means output to select said fourth means output when said third means output becomes substantially zero and to select said third means output when said third means output exceeds the substantially zero value, and sixth means coupled to said first, second and fifth means to produce the algebraic sum of said bank angle signal, said relative heading angle signal and said course displacement signal and to produce the algebraic sum of said bank angle signal, said course displacement signal and said rate of change of course displacement signal when said fifth means respectively responds to a third means output which is substantially zero and responds to a third means output which exceeds the substantially zero value.

2. Apparatus for guiding an aircraft onto a selected course comprising first means producing a signal proportional to the bank angle of said aircraft, second means producing a signal proportional to the aircraft displacement from said course, third means producing a signal proportional to the rate of change of displacement from said course, fourth means producing a signal proportional to angular displacement from a reference heading angle, said reference heading angle being the heading angle said aircraft has when said aircraft flies parallel to said course, fifth means coupled to said third and fourth means and responsive to said third means output to select said fourth means output when said third means output becomes substantially zero and to select said third means output when said third means output exceeds the substantially zero value, and sixth means coupled to said first, second and fifth means to produce the algebraic sum of said bank angle signal, said angular displacement from said reference heading angle signal and said course displacement signal and to produce the algebraic sum of said bank angle signal, said course displacement signal and said rate of change of said course displacement signal when said fifth means respectively responds to a third means output which is substantially zero and responds to a third means output which exceeds the substantially zero value.

3. Apparatus for guiding an aircraft onto a selected course comprising first means producing a signal proportional to the bank angle of said aircraft, second means producing a signal proportional to the aircraft displacement from said course, third means producing a signal proportional to rate of change of displacement from said course, fourth means producing a signal proportional to the heading angle of said aircraft relative to said selected course, fifth means coupled to said second means to integrate said second means output, sixth means producing the algebraic sum of said second means output and said fifth means output, said second means being coupled to said sixth means, seventh means responsive to said third means output and coupled to said third means, switching means coupled to said seventh means and responsive to said seventh means output, and eighth means coupled to said first and said sixth means, said switching means coupling therethrough said third means and said eighth means, said fifth means and said sixth means, and said fourth means and said eighth means, the output of said eighth means being the algebraic sum of said bank angle signal, said relative heading signal, said course displacement signal and said course displacement integral signal and being the algebraic sum of said bank angle signal, said course displacement signal and said rate of change of course displacement signal when said seventh means respectively responds to a third means output signal which is substantially zero and when said seventh means responds to a third means output signal which exceeds the substantially zero value.

4. Apparatus for guiding an aircraft onto a selected course comprising first means producing a signal proportional to the bank angle of said aircraft, second means producing a signal proportional to the aircraft displacement from said course, third means producing a signal proportional to rate of change of displacement from said course, fourth means producing a signal proportional to angular displacement from a reference heading angle, said reference heading angle being the heading angle said aircraft has when said aircraft flies parallel to said course, fifth means coupled to said second means to integrate said second means output, sixth means producing the algebraic sum of said second means output and said fifth means output, said second means output being coupled to said sixth means, seventh means responsive to said third means output and coupled to said third means, switching means coupled to said seventh means and responsive to said seventh means output, and eighth means coupled to said first means and said sixth means, said switching means coupling therethrough said third means and said eighth means, said fifth means and said sixth means, and said fourth means and said eighth means, the output of said eighth means being the algebraic sum of said bank angle signal, said course displacement signal, said course displacement integral signal and said angular displacement from said reference heading angle signal, and being the algebraic sum of said bank angle signal, said course displacement signal and said rate of change of course displacement signal when said seventh means respectively responds to a third means output signal which is substantially zero and when said seventh means responds to a third means output signal which exceeds the substantially zero value.

5. Apparatus for guiding an aircraft onto a selected course comprising first means producing a signal proportional to the bank angle of said aircraft, second means producing a signal proportional to the aircraft displacement from said course, third means producing a signal proportional to rate of change of displacement from said course, fourth means producing a signal proportional to the heading angle of said aircraft relative to said selected course, fifth means coupled to said third means to attenuate said third means output, sixth means coupled to said third means and responsive to said third means output, seventh means summing said fifth and fourth means outputs, switching means coupled to and responsive to said sixth means and coupling therethrough said seventh means and said fifth means, eighth means coupled to said first, second and seventh means, said switching means coupling therethrough said fourth means and said seventh means, and said third means and said eighth means, said eighth means summing said first, second and seventh means outputs and summing said first, second and third means outputs when said sixth means respectively responds to a third means output signal which is substantially zero and when said sixth means responds to a third means output which exceeds the substantially zero value.

6. Apparatus for guiding an aircraft onto a selected course comprising first means producing a signal proportional to the bank angle of said aircraft, second means producing a signal proportional to the aircraft displacement from said course, third means producing a signal proportional to the rate of change of displacement from said course, fourth means producing a signal proportional to angular displacement from a reference heading angle, said reference heading angle being the heading angle said aircraft has when said aircraft flies parallel to said course, fifth means coupled to said third means to attenuate said third means output, sixth means coupled to said third means and responsive to said third means output, seventh means summing said fifth and fourth means outputs, switching means coupled to and responsive to said sixth means and coupling therethrough said seventh means and said fifth means, eighth means coupled to said first, second and seventh means, said switching means coupling therethrough said fourth means and said seventh means, and said third means and said eighth means, said eighth means summing said first, second and seventh means outputs and summing said first, second and third means outputs when said sixth means respectively responds to a third means output signal which is substantially zero and when said sixth means responds to a third means output which exceeds the substantially zero value.

7. Apparatus for guiding an aircraft onto a selected course comprising first means producing a signal proportional to the bank angle of said aircraft, second means producing a signal proportional to the aircraft displacement from said course, third means producing a signal proportional to the rate of change of displacement from said course, fourth means producing a signal proportional to the heading angle of said aircraft relative to said selected course, fifth means coupled to said second means to integrate said second means output, sixth means producing the algebraic sum of said second and fifth means outputs, said second means output being coupled to said sixth means, seventh means responsive to said third means output coupled to said third means, switching means coupling therethrough said fifth and sixth means, said switching means being coupled to said seventh means output and responsive to said seventh means output, eighth means coupling said switching means to said third means and attenuating said third means output, said third means output being also coupled to said switching means, ninth means summing the outputs of said fourth and eighth means, said ninth means being coupled to said eighth means through said switching means and to said fourth means, and tenth means coupled to said first means, said sixth means, said ninth means and coupled through said switching means to said third means, said tenth means summing the bank angle signal, the course displacement signal, the integral of course displacement signal, the attenuated rate of change of course displacement signal and the heading angle relative to said selected course signal and summing the bank angle signal, the course displacement signal and the rate of change of course displacement signal when said seventh means respectively responds to a third means output which is substantially zero and responds to a third means output which exceeds the substantially zero value.

8. Apparatus for guiding an aircraft onto a selected course comprising first means producing a signal proportional to the bank angle of said aircraft, second means producing a signal proportional to the aircraft displacement from said course, third means producing a signal proportional to the rate of change of displacement from said course, fourth means producing a signal proportional to angular displacement from a reference heading angle, said reference heading angle being the heading angle said aircraft has when said aircraft flies parallel to said course, fifth means coupled to said second means to integrate said second means output, sixth means producing the algebraic sum of said second and fifth means outputs, said second means output being coupled to said sixth means, seventh means responsive to said third means output coupled to said third means, switching means coupling therethrough said fifth and said sixth means, said switching means being coupled to said seventh means output and responsive to said seventh means output, eighth means coupling said switching means to said third means and attenuating said third means output, said third means output being also coupled to said switching means, ninth means summing the outputs of said fourth and eighth means, said ninth means being coupled to said eighth means through said switching means and to said fourth means, and tenth means coupled to said first means, said sixth means, said ninth means and coupled through said switching means to said third means, said tenth means summing the bank angle signal, the course displacement signal, the integral of course displacement signal, the attenuated rate of change of course displacement signal and the angular displacement from said reference heading signal and summing the bank angle signal, the course displacement signal and the rate of change of course displacement signal when said seventh means respectively responds to a third means output which is substantially zero and responds to a third means output which exceeds the substantially zero value.

9. Apparatus for guiding an aircraft onto a selected course comprising first means producing a signal proportional to the bank angle of said aircraft, second means producing a signal proportional to the heading angle of said aircraft relative to said selected course, third means producing a signal proportional to the aircraft displacement from said course, fourth means coupled to said third means to integrate said third means output, fifth means producing a signal proportional to the rate of change of displacement from said course, switching means coupled to said fifth means and responsive to said fifth means output, seventh means coupled through said switching means to said fourth means, said seventh means being also coupled to said first means, said second means and said third means to sum said bank angle signal, said relative heading signal, said course displacement signal and said course displacement integral signal and to sum said bank angle signal, said relative heading angle signal and said course displacement signal when said switching means respectively responds to a fifth means output which is substantially zero and responds to a fifth means output which exceeds the substantially zero value.

10. Apparatus for guiding an aircraft onto a selected course comprising first means producing a signal proportional to the bank angle of said aircraft, second means producing a signal proportional to the aircraft displacement from said course, third means producing a signal proportional to the true heading angle of said aircraft, fourth means producing a signal proportional to the heading angle of said aircraft at the time when said aircraft flies parallel to the course, fifth means, normally open switching means coupling said fifth means to said fourth means, said fifth means being coupled to said third means and summing said third and fourth means output signals when said switching means is closed, sixth means producing a signal proportional to the rate of change of course displacement, seventh means responsive to said sixth means output signal to close said switching means when said sixth means output signal is substantially zero, and eighth means coupled to said first, second and fifth means producing the algebraic sum of said bank angle signal, said course displacement signal, and said rate of change of course signal when said switching means is open, and producing, when said switching means is closed, the algebraic sum of said bank angle signal, said course displacement signal, said true heading signal and said signal proportional to the heading angle of said aircraft at the time said aircraft flies parallel to the course.

No references cited.